Nov. 7, 1939.  M. A. KENDALL  2,179,187
BELT CONVEYER
Filed Feb. 13, 1937   10 Sheets-Sheet 3
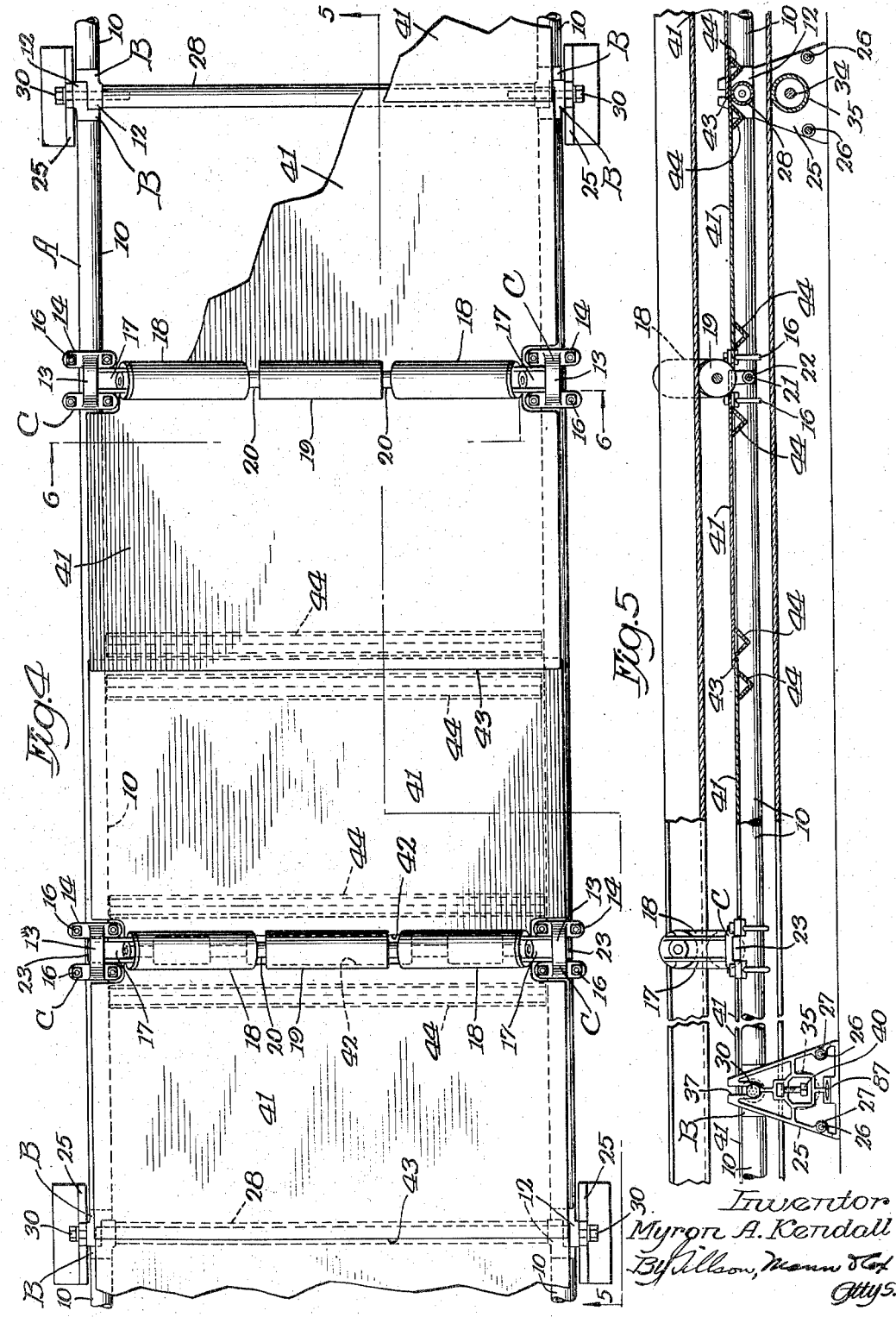

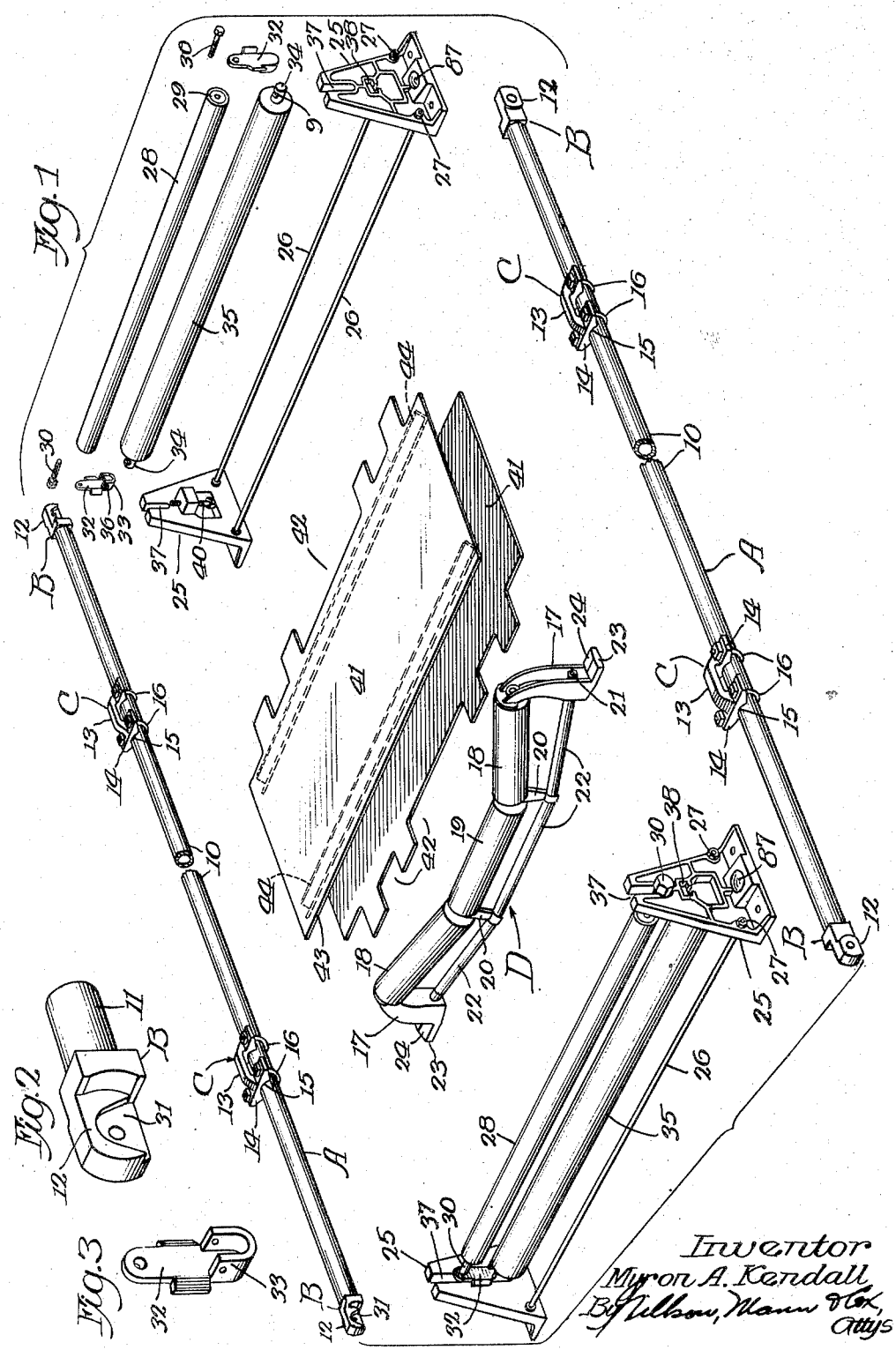

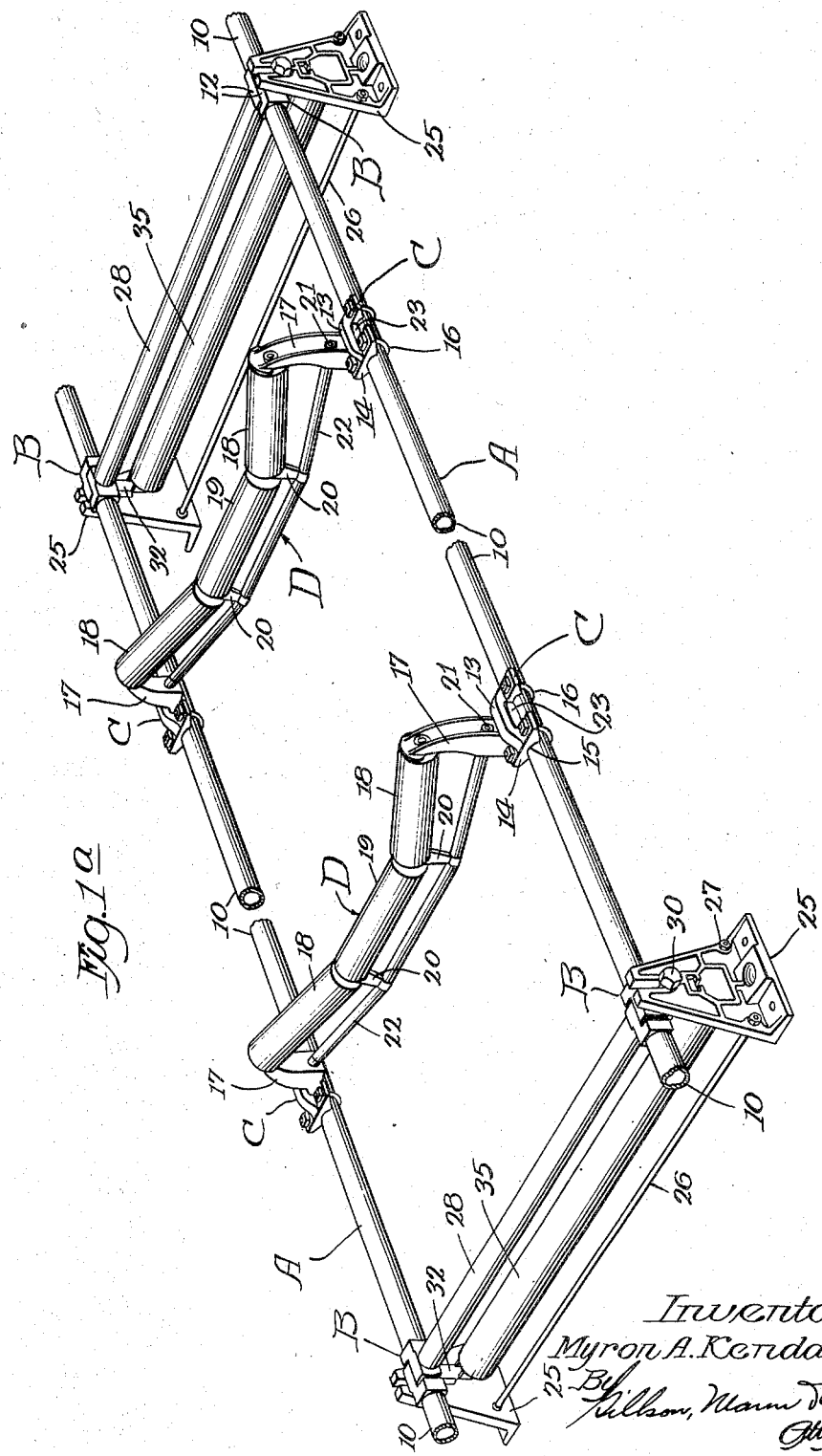

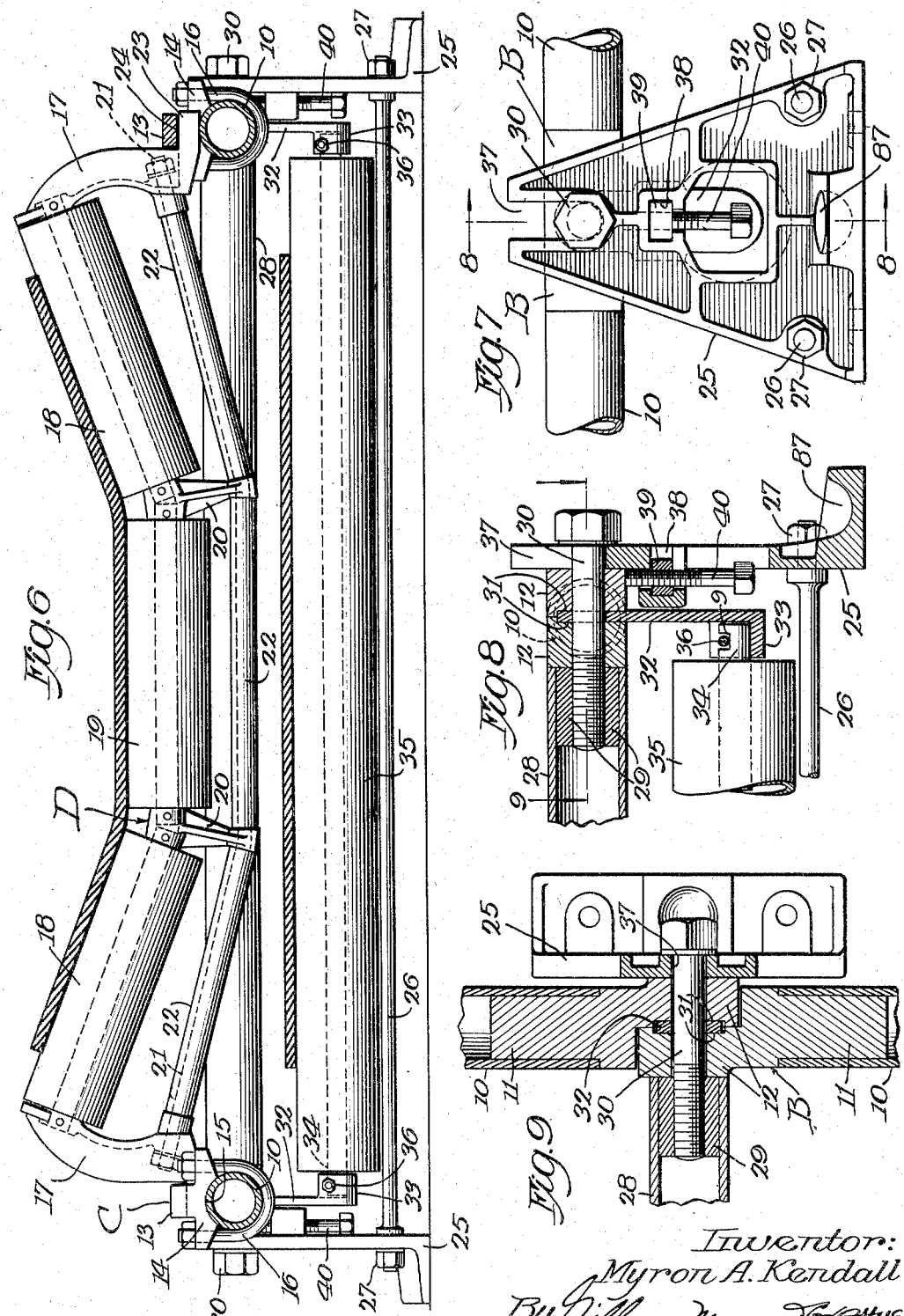

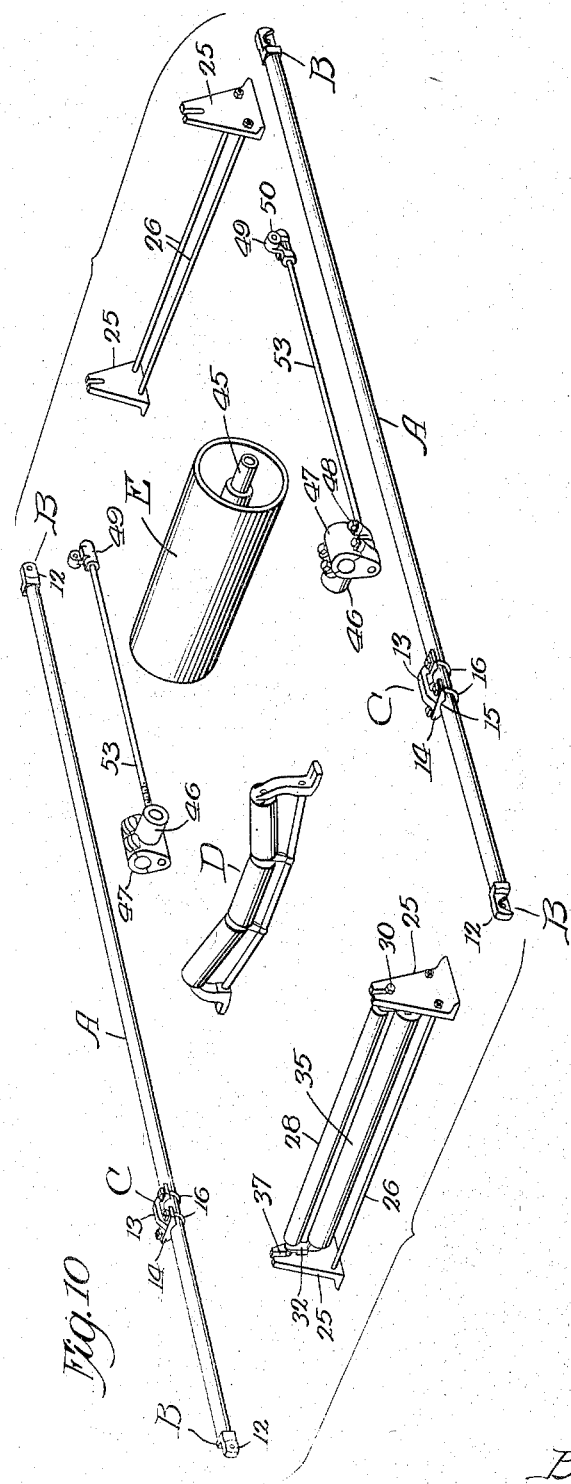
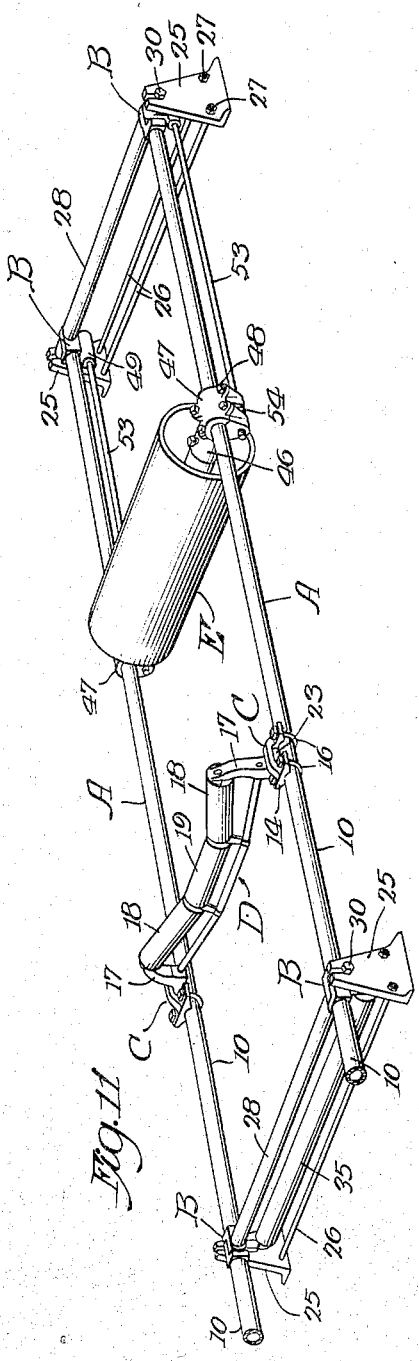

Nov. 7, 1939.    M. A. KENDALL    2,179,187
BELT CONVEYER
Filed Feb. 13, 1937    10 Sheets-Sheet 6

Inventor:
Myron A. Kendall
By Tillson, Mann & Cox
Attys.

Nov. 7, 1939.  M. A. KENDALL  2,179,187
BELT CONVEYER
Filed Feb. 13, 1937  10 Sheets-Sheet 7
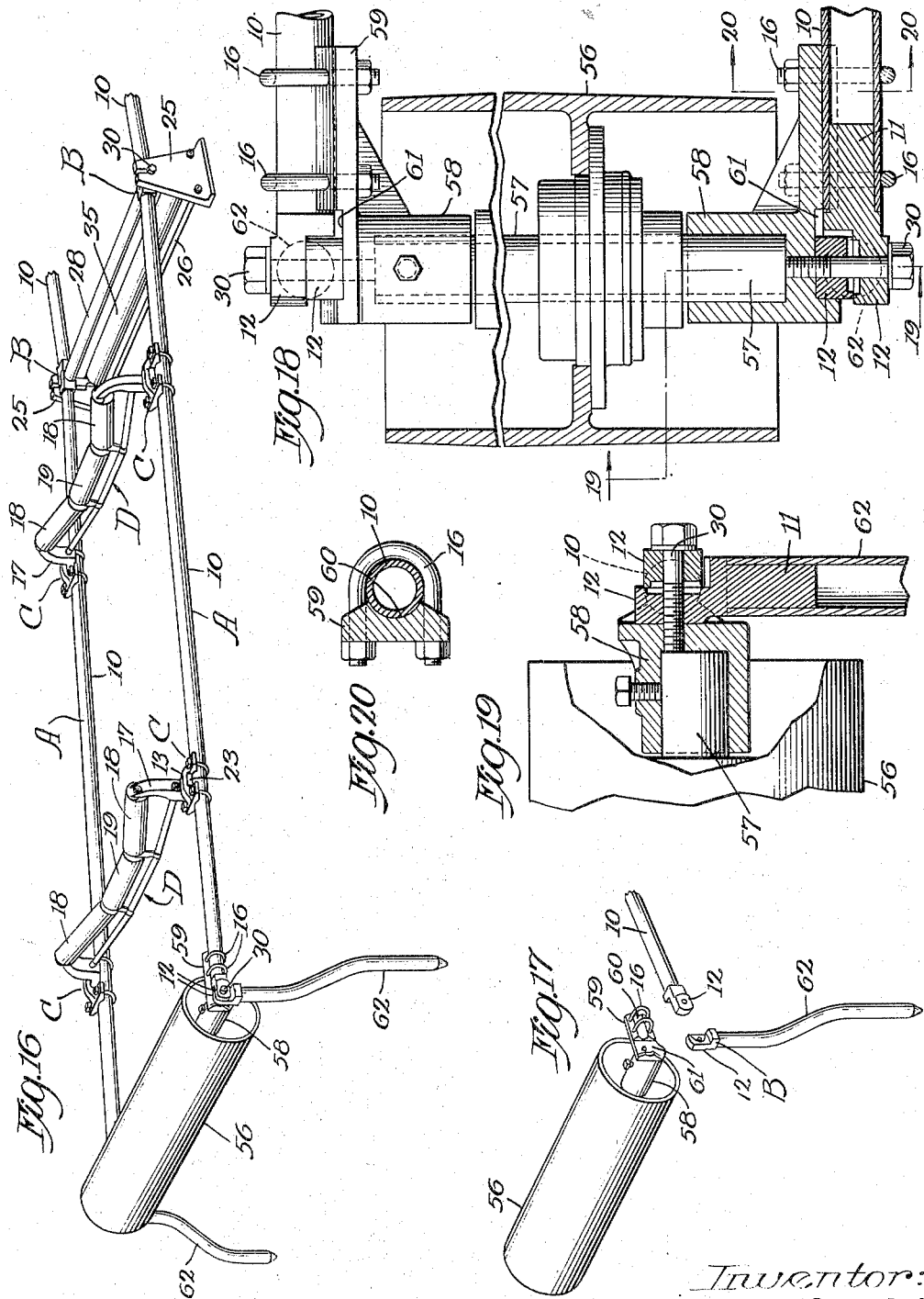
Inventor:
Myron A. Kendall
By Wilson, Mann & Cox
Attys.

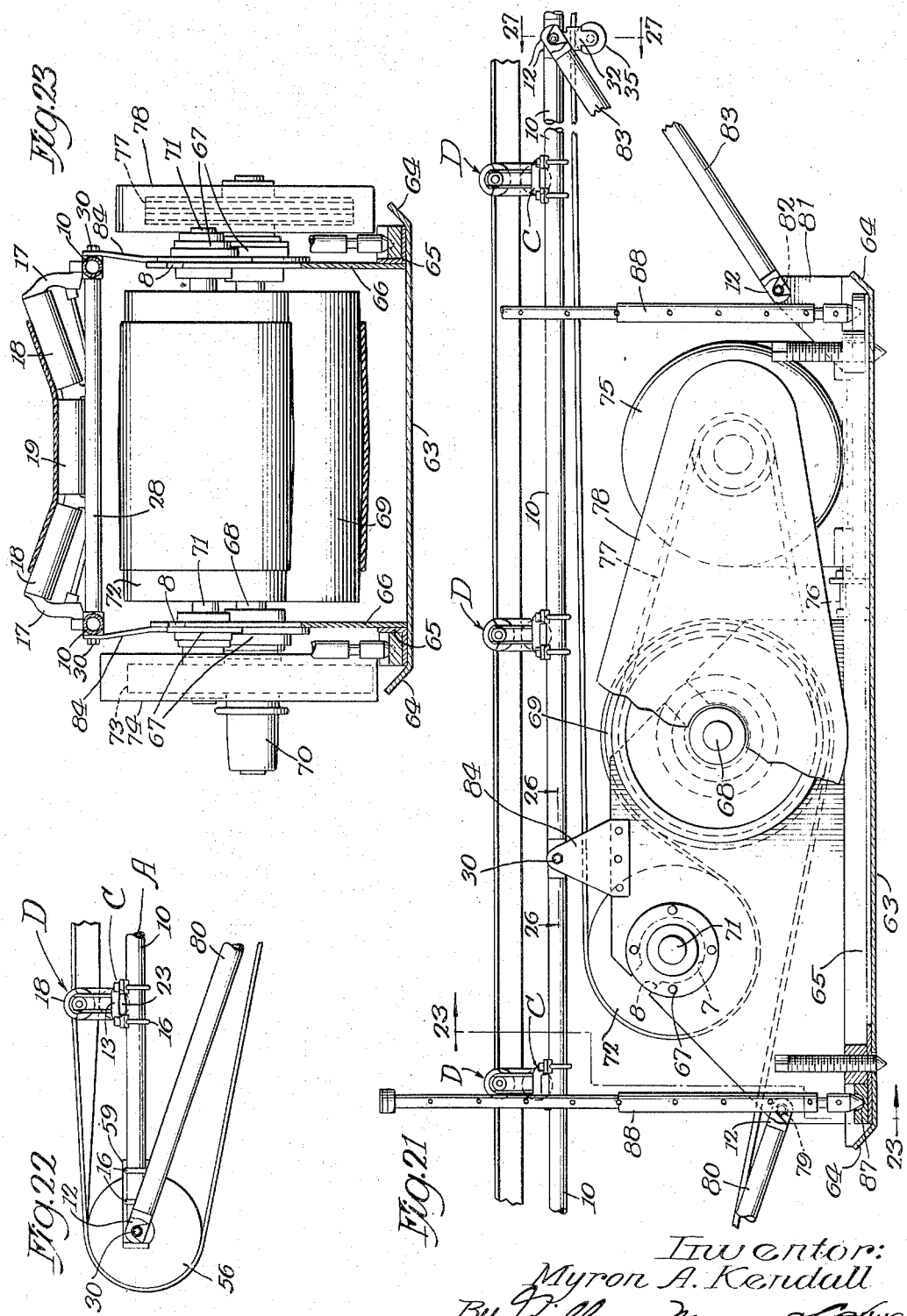

Nov. 7, 1939.   M. A. KENDALL   2,179,187
BELT CONVEYER
Filed Feb. 13, 1937   10 Sheets-Sheet 9
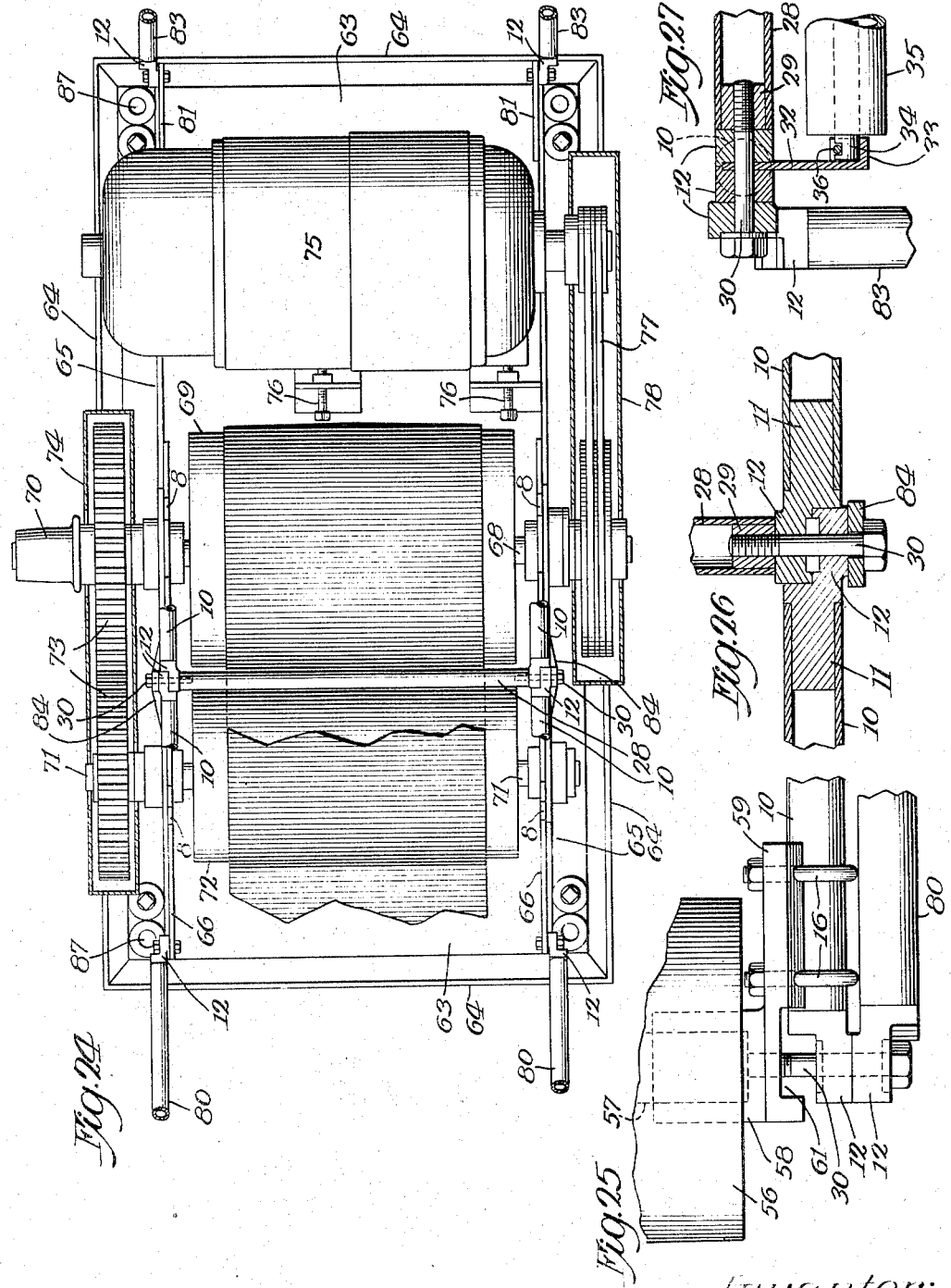
Inventor:
Myron A. Kendall

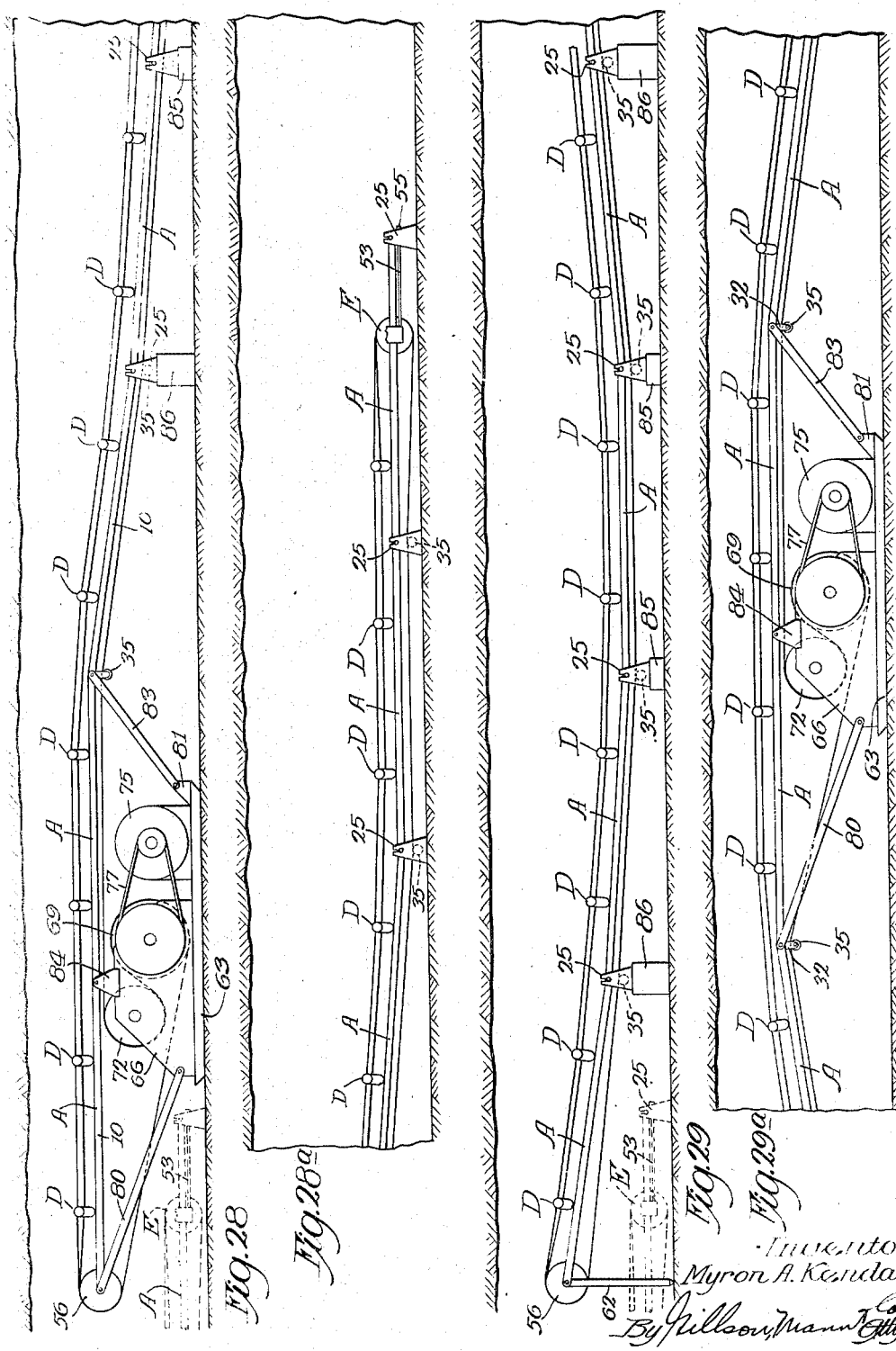

Patented Nov. 7, 1939

2,179,187

UNITED STATES PATENT OFFICE 2,179,187

BELT CONVEYER

Myron A. Kendall, Aurora, Ill., assignor to Stephens-Adamson Mfg. Co., a corporation of Illinois Application February 13, 1937, Serial No. 125,573

19 Claims. (Cl. 198—192)

The use of belt conveyers in mines has been beset with many varied difficulties inherent in the conditions. For instance, the length of the haul changes as the mineral is removed. That makes it necessary to change the length of the conveyer frequently, and everything used for that purpose must be taken in from the mine entry to the remote end of the conveyer or further. The clearances are small, and the mine floor is often irregular. In shallow veins—three feet or less in thickness—the men work at such great disadvantage that handling heavy bulky things entails great labor, and is done slowly.

The principal object of this invention is to produce a conveyer in sections, each composed of light parts of such dimensions that they can be taken into the mine on the conveyer (which is made quickly reversible for that purpose) and easily handled in the narrower spaces, and assembled to form a sturdy structure for efficient operation, and so low that it can be used in the thinnest workable veins.

Further objects and advantages of the invention will appear as the disclosure proceeds and the description is read in connection with the accompanying drawings illustrating the preferred embodiment of the invention, and in which Fig. 1 is a perspective view of the parts forming an intermediate section of the conveyer and two of the supporting stands;

Fig. 2 is a perspective view of one of the joint fittings forming a part of each side rail;

Fig. 3 is a perspective view of one of the return roller hanger brackets for supporting the opposite ends of the return rollers on the stands;

Figure 12:
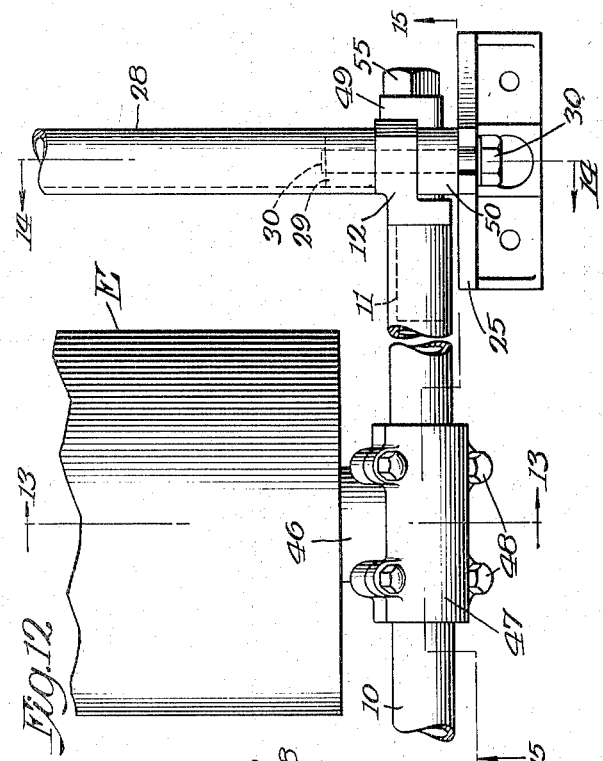
Figure 15:
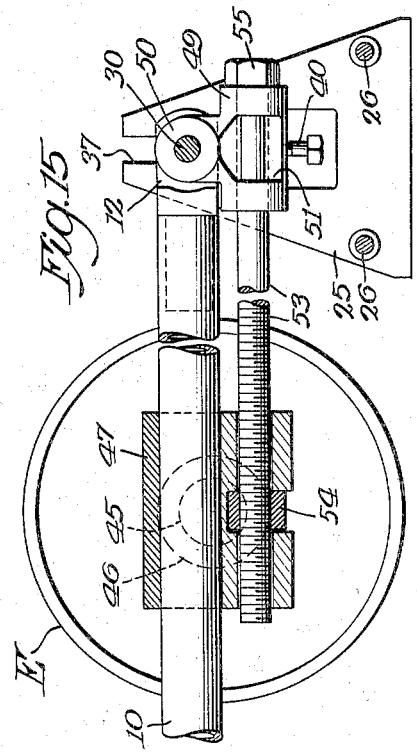
Figure 13:
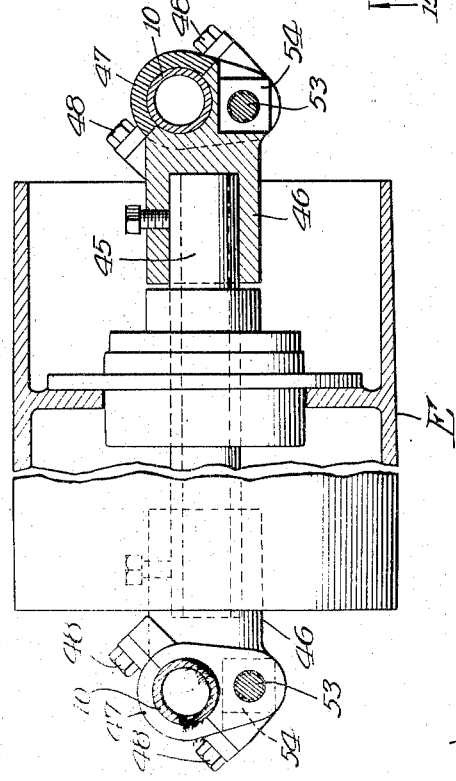
Figure 14:
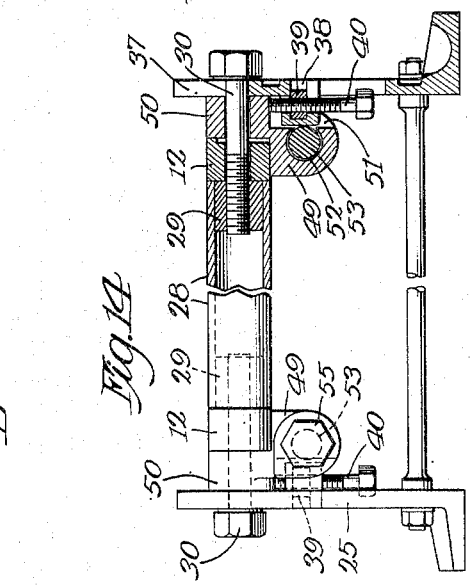

Fig. 1ª is a perspective view of one of the intermediate sections of the conveyer and the adjacent portions of two additional sections;

Fig. 4 is a plan view of an intermediate section and two adjacent sections;

Fig. 5 is a longitudinal section on the line 5—5 of Fig. 4;

Fig. 6 is a transverse section on the line 6—6 of Fig. 4;

Fig. 7 is an elevation of one of the stands and the adjacent side bars of two sections;

Fig. 8 is a vertical section on the line 8—8 of Fig. 7;

Fig. 9 is a horizontal section on the line 9—9 of Fig. 8;

Fig. 10 is a perspective view of the parts that form a tail or take-up pulley section;

Fig. 11 is a perspective view of a tail or take-up pulley section and the adjacent end of an intermediate section of the conveyer;

Fig. 12 is a plan view of one corner portion of the take-up pulley section, on an enlarged scale;

Fig. 13 is a vertical section taken on the line 13—13 of Fig. 12;

Fig. 14 is a transverse section on the line 14—14 of Fig. 12;

Fig. 15 is a longitudinal sectional on the line 15—15 of Fig. 12;

Fig. 16 is a perspective view of the head pulley section and the adjacent portion of one of the intermediate sections;

Fig. 17 is a perspective view of the parts at one corner of the head pulley section shown in Fig. 16;

Fig. 18 is a plan view, partly in section and partly broken away, of the head pulley and its mounting;

Fig. 19 is a vertical section taken on the line 19—19 of Fig. 18;

Fig. 20 is a transverse section on the line 20—20 of Fig. 18;

Fig. 21 is a side elevation of a tandem drive unit assembly with adjacent parts of other sections of the belt conveyer;

Fig. 22 is a side elevation of a part of a head pulley section suitable for use at the left in Fig. 21;

Fig. 23 is a transverse section on the line 23—23 of Fig. 21;

Fig. 24 is a plan view of the drive unit assembly;

Fig. 25 is a partial plan view of the head pulley section shown in Fig. 22;

Fig. 26 is a horizontal section on the line 26—26 of Fig. 21;

Fig. 27 is a vertical section on the line 27—27 of Fig. 1;

Figs. 28 and 28ª are diagrammatic views of portions of a belt conveyer with the drive unit at the head end and delivering to a second conveyer. That portion shown in Fig. 28ª should be at the right of the portion shown in Fig. 28;

Figs. 29 and 29ª are similar diagrams showing the drive unit at an intermediate part of the conveyer. In this instance a complete view of the conveyer would require Fig. 29 to be laid at the left of Fig. 29ª, and Fig. 28ª to be laid at the right thereof.

But these particular illustrations and the corresponding description are used for the purpose of disclosure only, and it is realized that the forms can be variously changed without departing from the substance of the invention intended to be covered by the claims.

For example, a designer could readily replace the rails and joints here shown with forms familiar in connection with bed steads.

The intermediate section

Each intermediate section of the conveyer includes two side rails A (Figs. 1 and 1a), here shown as made of lengths 10, of seamless steel tubing, equipped at each end with joint fittings B, each having a cylindrical shank 11 inserted in an end of the tubing, and welded, riveted, or otherwise made fast.

Each joint fitting also has a lap flange 12, slightly offset laterally with respect to the side rail to make two such flanges overlapping form the basis of a joint between adjacent side rails lengthwise in the conveyer.

About one-fourth of the distance from each end of each side rail A is a bearing bracket C, comprising an arched bridge portion 13 and two abutment portions 14, each having a curved seat 15 to rest upon the cylindrical surface of the rail A to which it is secured by a U-bolt 16.

The bearing brackets C are intended to receive the carriers D, the preferred form of which is the subject of my co-pending application Ser. No. 61,686, filed January 31, 1936, and fully disclosed therein. It will here suffice to say that the carrier is composed of two end brackets 17, which, with the shafts of rollers 18 and 19, form the compression member of a truss including struts 20 and a tension member 21 inclosed within tubes 22, and extending through the lower portion of the bracket 17.

Each bracket has a lug or trunnion 23 to be received within the bearing bracket C and rest upon the adjacent portion of the side rail A. Both the upper and lower faces of the trunnions are inclined, as indicated at 24, to provide a sort of knife edge bearing that will permit the carrier as a whole to rock or incline from the vertical in the direction the belt is traveling, and thereby make it self-training.

The return roller stand assembly

The adjacent ends of two sections of the conveyer are connected to and supported by a structure called, for want of a better term, return roller stand. Each stand includes end brackets 25, connected by two shouldered rods 26, fitted with nuts 27 which together make a sub-assembly, shown at the right in Fig. 1, adapted to be placed on the mine floor adjacent to the place where it is to be connected with the other parts in the conveyer.

There is a cross rail 28 for each stand which includes a length of steel tubing fitted with threaded plugs 29, welded, riveted, or otherwise secured in place at the ends of the rail (Figs. 1, 8 and 9). Each cross rail 28 is fitted between the spaced joint fittings of the adjacent side rails, and these in turn are just within the brackets 25 (Figs. 8 and 9). The parts are secured in this position by machine bolts 30, having a considerable portion unthreaded, as best seen in Figs. 8 and 9.

Each lap flange 12 of the joint fittings B on the side rails has a recess 31 (Figs. 1 and 2), and two of these brought together make a socket to receive the upper end of a return roller hanger bracket 32 (Figs. 3, 8 and 9), which has a hole to receive the corresponding bolt 30 upon which it is supported. The lower end of each hanger bracket has a U-shaped flange 33, to receive the notched ends 34 (Figs. 1 and 8) of the return roller 35, which is made fast by a bolt 36 passing through the sides of the flange 33 and the notch 9 in the return roller shaft 35.

The bolts 30 pass through slots 37 (Figs. 1, 7, 8 and 9) in the brackets 25 to permit vertical adjustment for aligning the conveyer. This is accomplished by providing each bracket with a socket 38 to receive and hold a nut 39 on an adjusting bolt 40, the upper end of which is against the lower side of the outermost lap flange 12 (Fig. 8). By adjusting the bolt 40 and the nut 39 the adjacent ends of the conveyer sections, with the corresponding return roller, can be adjusted to put the assembly in proper alignment.

In order to protect the return run of the belt each section of the conveyer is provided with deck plates 41, notched at the edge 42 to fit around the intermediate roller 19 and the strut members 20 on the carrier, when assembled as shown in Figs. 4 and 5, where the straight edges 43 overlap, as best seen in Fig. 5. The deck plates are stiffened by angles 44, having their flanges welded to the under sides of the plates, as shown in Fig. 5.

In assembling a conveyer the side rails A, the carriers D, the return roller stand assemblies and the deck plates 41 are distributed along the route in groups, somewhat after the fashion indicated in Fig. 1, after which the assembly of each intermediate section in turn is very easily accomplished. The trunnions 24 of the carriers are inserted in the bearing brackets C on the side rails; the joint fittings are brought together at the corresponding return roller stand, and the bolts 30 inserted and set up lightly. The adjusting bolts 40 are then turned to line up the assembly, and the bolts 30 set up finally. The deck plates 41 are set in place with their adjacent edges raised, after which they are simply allowed to fall into position, as shown in Fig. 5. Some such procedure is followed with each intermediate section as the conveyer frame is built along the route.

When additional intermediate sections are inserted to extend a conveyer a corresponding length of belt will be spliced in between the ends of the existing belt.

Take-up or tail pulley section

The take-up or tail pulley section is shown on Sheets 5 and 6 (Figs. 10 to 15). It is composed in the main of elements such as described in connection with the intermediate section, including side rails A connected to the last intermediate section and the supporting stand, in the same way as with the intermediate sections throughout the conveyer.

The endmost carrier D is replaced by a tail pulley E, journaled on a hollow shaft 45, mounted in bearings 46, secured to the rails A by caps 47 and bolts 48, with sufficient clearance to permit an adjustment lengthwise to the rails.

There being no return roller 35, the return roller brackets 32 are omitted at the endmost stand. In their place are take-up brackets 49 (Figs. 10, 12, 14 and 15), which have lugs 50 adapted to take the place of one of the lap flanges 12 just inside the end brackets 25 of the most remote stand. The body portions of the tail brackets 49 are recessed at 51, to clear the adjusting bolt 40 and associated parts, and have a lengthwise bore 52 to receive the adjusting bolts 53, cooperating with nuts 54, one for each of the bearings 46 (Figs. 14 and 15). The lugs 50 of the tail brackets cooperate with adjusting screws to provide for the alignment of the remote end of the take-up or tail pulley section. The take-up is effected by simply turning the bolts 53 by means of the heads 55.

Head pulley section

The head pulley section (Sheet 7, Figs. 16 to 20) is also similar to the intermediate sections from which it is distinguished by replacing the usual return roller stand assembly and cross rail with the head pulley assembly.

The head pulley 56, preferably of cast iron, is journaled on a hollow shaft 57, having its ends mounted in head pulley bracket bearings 58, each of which has a laterally directed flange 59, provided with a concave surface 60 to fit the adjacent end of the side rail A, to which it is secured by U-bolts 16. Each head pulley bracket also has a recess 61 that cooperates with the adjacent joint flange 12 to form a socket for a joint flange 12 on a joint fitting B, fixed to the upper end of a head pulley standard 62. Bolts 30, passing through the joint flanges and into the bearing brackets, connect them in much the same manner as the parts are connected together at the return roller stands, except that there is no adjustment provided in the head pulley assembly.

The drive unit

The drive unit is on a sled base 63 of sheet steel, having an upwardly inclined flange 64 all around and stiffened by an angle 65, running lengthwise adjacent to each side. Steel plates 66, fastened to the upright flanges of these angles, form brackets for supporting the tandem drive rollers. They have slots 8 for the shafts leading to round openings 7, within which the roller bearings 67 for the shafts are mounted.

The shaft 68 for the primary drive roller 69 is equipped with a capstan 70 at one end, and the drive from the shaft 68 is communicated to the shaft 71 of the secondary drive roller 72 by gears 73, protected by a housing 74.

The motor 75 is bolted to slotted rails (not shown) fastened to the sled, and it is aligned by adjusting screws 76. The drive from the motor to the primary drive roller 69 is through belts 77, protected by a housing 78.

This drive unit may be placed at either end, or at any place between the ends of the conveyer. In Fig. 28 it is shown at the head end, and in Fig. 29ª in an intermediate position. The means of connecting it to the conveyer sections are very simple. The brackets 66 are provided with openings 79 (Fig. 21 at the left), to receive bolts for securing inclined braces 80, extending in an upward incline to the head end assembly (Fig. 28), or to an intermediate joint in Fig. 29ª.

At the right in Fig. 21 the drive unit base is equipped with small brackets 81, fastened to the angle 65 and provided with openings 82 to receive bolts securing other braces 83 that extend on an upward incline to the adjacent joint between two intermediate sections.

The braces 80 and 83 are made of tubing similar to the side rails, and have joint fittings B made fast to their ends. For that reason either end can go up or down, and the standard fastening means will suffice for both ends.

A joint between two intermediate sections will come at a point just above and between the tandem drive rollers 69 and 72. To afford a support for that joint the brackets 66 are provided with angle plates 84, having openings to receive the bolts 30 used at all the joints for fastening the parts together.

It will be observed from sheet 10 that the conveyer structure as an entirety is elevated above the drive unit. This makes it expedient to provide blocks 85 and 86 for some of the return roller stands in order to give the conveyer structure a steady support.

All of the end brackets 25 of the return roller stands and the base of the drive unit are provided with suitable sockets 87 to receive jacks 88 for making the conveyer fast within the mine.

Heretofore sectional conveyers have been made in sections of uniform length, fully assembled at the factory and necessarily handled as units at the place of installation. Unavoidably they were too bulky and heavy to be handled with ease in a mine, or to be transported on a conveyer, and under the conditions existing in many mines they were simply impractical. The want of a suitable construction has retarded the use of conveyers in mines and kept the cost of mining correspondingly high.

The extreme portability and universal interchangeability of parts, together with the fact that all of the sections of the conveyer are easily built up and taken apart in the most restricted places in mines, clearly distinguishes the present invention from prior constructions. All of the parts necessary to extend a conveyer, or to build up the standard sections of another conveyer, can be taken into the mine on the belt. The three-pulley carrier, weighing thirty-four pounds, is the heaviest element entering into all of the intermediate sections. The total weight of all of the parts necessary to make up a complete intermediate section and return roller stand for extending a conveyer is approximately one hundred and five pounds. Except for the head and tail pulleys, the carriers are the heaviest elements of the head and tail sections, and most of the parts in the head and tail sections are interchangeable with the parts in the intermediate sections.

The portability and interchangeability of the parts also serves to divorce production from orders on the books and reduce the cost of transportation from the factory or supply store to the place of use.

The self-training feature of the carriers, together with the reversible motor, makes the conveyer instantly reversible to take men, tools and materials into and out of the mine.

The hinged adjustable joints between the sections, and the self-training feature, permit the conveyer to follow the contour of the mine floor and the belts to center themselves without elaborate blocking.

The construction keeps the conveyer low enough for installation anywhere that men can work and yet provides the ruggedness necessary for long life under severe conditions.

Preferably the sections are eight feet between the bolt centers at the joints, and the carrier bearings are four feet apart on the centers and equally spaced from the ends of the side rails. Rails made of 1½" standard pipe have been found sufficiently strong.

All of the rollers are equipped with sealed ball bearings lubricated for the life of the carrier.

Contractors and builders have also found the invention of great advantage where conveyers are to be set up temporarily and shifted frequently.

While for convenience in disclosure a belt conveyer has been shown and described, the substance of the invention can be embodied in other conveyers, and the claims should be read accordingly.

I claim as my invention—

1. In a belt conveyer, sections each comprising a single light rail member at each side of the conveyer and having a joint fitting secured at each end, a trough-shaped carrier crosswise to the rails, means including rockable members and aligned bearings on the rails for supporting the carrier, a stand for the adjacent ends of two sections, means for connecting the joint fittings and stand, and means for mounting a roller on said stands for supporting a conveyer belt during its return movement.

2. In a belt conveyer, sections including a tail section, each comprising a single light side member at each side of the conveyer and having a joint fitting secured at each end, a carrier crosswise to the rails, aligned bearings on the rails for the carrier, a stand for the adjacent ends of two sections, means for rigidly connecting the joint fittings and the stand, and a return roller for the stand.

3. In a belt conveyer, sections each comprising side rails of equal length spaced apart and having a joint fitting secured at each end, means for securing the fittings of adjacent sections together to form a fixed joint, a carrier crosswise to the rails, aligned bearings on the rails for the carrier, means for supporting said carrier as a unit, said carrier being supported from its ends only from said rails, a stand for the adjacent ends of two sections, a return roller for each stand, and means for connecting the joint fittings and the return roller to the stand.

4. In a belt conveyer comprising longitudinal sections, including a tail section, each section comprising a single side rail at each side of the conveyer, a rail of adjacent sections having a joint fitting at its end overlapping a similar joint fitting on the end of the rail of an adjacent section, means for connecting said fittings together to form a fixed joint, a stand including a bracket, and a bolt connecting the joint fittings and the bracket.

5. In a belt conveyer comprising longitudinal sections, a rail of adjacent sections having a joint fitting at its end overlapping a similar joint fitting on the end of the rail of the other section, a stand including a bracket, a bolt connecting the joint fittings and the bracket, a return roller, and a hanger for the return roller secured to the joint fittings by the bolt.

6. In a belt conveyer comprising longitudinal sections, a rail of adjacent sections having a joint fitting at its end overlapping a similar joint fitting on the end of the rail of the other section, a stand including a bracket, a bolt connecting the joint fittings and the bracket, a return roller, and a hanger for the return roller suspended between the joint fittings and secured to the joint fittings by the bolt.

7. In a belt conveyer comprising longitudinal sections, a rail of adjacent sections having a joint fitting at its end overlapping a similar joint fitting on the end of the rail of the other section, a stand including a slotted bracket, a bolt through the joint fittings and the slot in the bracket, a bracket supported from said bolt at each side of the conveyer, a return roller supported by said last-named brackets, and means to adjust the joint fittings vertically.

8. In a belt conveyer comprising longitudinal sections, a rail of adjacent sections having a joint fitting at its end overlapping a similar joint fitting on the end of the rail of the other section, a stand including a slotted bracket, a bolt through the joint fittings and the slot in the bracket, and a second bolt on the bracket for adjusting the joint fittings vertically.

9. In a belt conveyer, sections each comprising side rails of equal length spaced apart and having a joint fitting secured at each end, a carrier crosswise to the rails and supported by a single rail at each side of the conveyer, means for supporting said carriers for automatically rocking to either side of the vertical for automatically centering the belt conveyer on said carrier when the same is moved in either direction, a stand for the adjacent ends of two sections, means for connecting the joint fittings and the stand, and means to adjust the joint fittings vertically relative to the stands to align the belt.

10. In a conveyer comprising a conveyer belt, a plurality of sections, joints connecting the sections, a drive unit adapted to be placed under any of said joints, means to support any one of said joints on the drive unit, and other means to brace adjacent joints from the drive unit whereby the conveyer belt may be driven from different points along said conveyer.

11. In a belt conveyer, sections, including a tail section, each comprising a single light side rail at each side of the conveyer of equal length, spaced apart and having a joint fitting secured at each end, means for rigidly securing the joint fittings of adjoining sections together, a carrier crosswise to the rails, aligned bearings on the rails for the carrier, a stand for the adjacent ends of two sections, and threaded connections for the joint fittings and the stand.

12. In a belt conveyer, a head pulley section, a tail pulley section and intermediate sections, each of said intermediate sections and the tail section having duplicate side ends comprising tubular side rails with like joint fittings at each end, carrier bearings spaced equally from the ends of the rails and carried thereby, a carrier for each pair of transversely aligned bearings, a stand for the adjacent ends of two sections, and means for connecting the adjacent joint fittings together and to the stand.

13. In a belt conveyer of the type having trough-shaped belt carriers rockably supported so as to be movable both ways from the vertical to center the belt regardless of the direction in which it is driven, the combination which includes conveyer sections each comprising a single, light tubular rail at each side of the section, a half-lap joint fitting at each end of each rail, and bearing brackets for the carriers adjustable circumferentially about the rails, whereby the bearings brackets may be rotated with relation to the rails of each section so that the end fittings of the rails may be brought into register and be connected with the fittings of an adjacent section with said bearing brackets properly positioned on the rails to mount said carriers.

14. A conveyer comprising a head section, an intermediate section and a tail section, each section including a pair of side rails adapted to be interchanged as between all of said sections, stands and cross rails forming part of said sections and adapted to be interchanged as between all of said sections, and means for connecting adjacent side rails, cross rails and stands together.

15. In a belt conveyer, a head pulley section, a tail pulley section, a plurality of intermediate sections, each comprising side rails, detachable connecting means for said sections forming similar joints between each pair of adjacent sections, belt carriers for said sections, means for mounting said carriers on said rails, means for supporting said sections, a carrier belt trained over said carriers, a power unit for driving said belt, and means mounting the power unit in direct operative relation to the belt in any of said sections along the entire length of the conveyer comprising a support for the unit and means connecting said support interchangeably to any of said joints.

16. In a belt conveyer, a plurality of sections, including intermediate, head and tail sections, each section comprising a side member at each side of the conveyer, means for detachably connecting said sections together, a plurality of carriers mounted on said side members, supports secured to said side members, a belt trained over said carriers, a power unit for driving said belt including a motor, a driving pulley operatively engaged with a return run of the belt, and a base mounting the motor and driving pulley, and means interchangeably connectible to the side members of any of said sections for positioning said base beneath the belt in any of said sections.

17. In a belt conveyer, a tail pulley section comprising two side rails having similar joint fittings at each end, a stand, means for connecting corresponding ends of the rails to the stand, a carrier spaced from the ends of the rails, a tail pulley mounted on the rails, means extending to the outer end of the section for adjusting said pulley along said side rails, and a single standard at the outer end of each rail connected to the adjacent joint fittings of said side rails for constituting the sole means for supporting the outer end of said section.

18. In a belt conveyer of the type having trough-shaped belt carriers rockably supported so as to be movable both ways from the vertical to center the belt regardless of the direction in which it is driven, the combination which includes conveyer sections each comprising a single, light tubular rail at each side of the section, a half-lap joint fitting at each end of each rail, bearing brackets adapted to be mounted on the upper surface of the rails to mount the carriers on the rails, and means adjustably clamping said brackets to the rails whereby the brackets may be turned relatively to the rails so that the end fittings of the rails of adjacent sections will register for connection together with the brackets properly positioned on the rails to mount the carriers.

19. In a sectional belt conveyer for use in mines and the like, a plurality of light frame sections including a head section, a tail section, and at least one intermediate section, each section comprising a single side rail at each side of the conveyer which are substantially duplicates of those of the other sections, each rail having joint fittings at the ends thereof, means for adjustably connecting the joint fittings of adjacent rails together so that the sections may be adjusted in a vertical plane relative to each other for causing them to conform to the floor of a mine, cross-rails for connecting the side rails of each section, respectively, together, a light belt supporting carrier on each section, a conveyer belt trained over said carriers, stands for supporting the ends of said sections, a drive unit, and means for connecting said unit to said conveyer beneath any of said sections for driving said conveyer belt.

MYRON A. KENDALL.